(12) United States Patent
Claudet et al.

(10) Patent No.: US 8,504,816 B2
(45) Date of Patent: Aug. 6, 2013

(54) INTEGRATED CIRCUIT DEVICE CONFIGURATION

(75) Inventors: Frederic Marc Edouard Claudet, Rousset (FR); Bruno Pierre Lucien Poncet, Marseilles (FR)

(73) Assignee: Atmel Rousset S.A.S., Rousset Cedez (FR)

( * ) Notice: Subject to any disclaimer, the term of this patent is extended or adjusted under 35 U.S.C. 154(b) by 442 days.

(21) Appl. No.: 12/686,221

(22) Filed: Jan. 12, 2010

(65) Prior Publication Data

US 2011/0173424 A1     Jul. 14, 2011

(51) Int. Cl.
*G06F 9/00*     (2006.01)

(52) U.S. Cl.
USPC ................................ 713/100; 713/1; 713/2

(58) Field of Classification Search
USPC .................................................. 713/1, 2, 100
See application file for complete search history.

(56) References Cited

U.S. PATENT DOCUMENTS

| | | | |
|---|---|---|---|
| 5,506,490 A * | 4/1996 | DeMuro | 320/106 |
| 7,240,226 B2 * | 7/2007 | Matsuoka | 713/300 |
| 2004/0018774 A1 * | 1/2004 | Long et al. | 439/620 |
| 2005/0268000 A1 * | 12/2005 | Carlson | 710/15 |
| 2007/0064819 A1 * | 3/2007 | Langer | 375/257 |
| 2011/0099298 A1 * | 4/2011 | Chadbourne et al. | 710/10 |

* cited by examiner

*Primary Examiner* — Paul Yanchus, III
(74) *Attorney, Agent, or Firm* — Fish & Richardson P.C.

(57) ABSTRACT

Various embodiments include an integrated circuit (IC) device having a conductive contact, and a circuit to determine a resistance value of a circuit path between the conductive contact and a circuit node during an initialization mode of the device. The IC device includes a controller to select at least one value of at least one operating parameter of the device based at least in part on the resistance value.

28 Claims, 8 Drawing Sheets

| RESISTANCE VALUE (RESISTOR R_EX) | OSCILLATOR STATE/ FREQUENCY | DCDC STATE/OUTPUT VOLTAGE | LDO STATE/OUTPUT VOLTAGE | | |
|---|---|---|---|---|---|
| | | | LDO$_1$ | LDO$_2$ | LDO$_3$ |
| NC | ON/10MHZ | ON/1.8V | OFF | OFF | ON/3.3V |
| 154 | ON/5MHZ | ON/3.3V | ON/2.5V | ON/1.8V | ON/3V |
| 140 | ON/1MHZ | ON/3.3V | ON/2.5V | OFF | ON/3V |
| 127 | ON/1MHZ | ON/1.8V | OFF | OFF | ON/3V |
| 110 | ON/1MHZ | ON/3.3V | OFF | OFF | OFF |
| 100 | ON/500KHZ | ON/1.8V | ON/1.5V | ON/2.7V | ON/3.3V |
| 91 | ON/32.768KHZ | OFF | ON/1.5V | ON/2.7V | ON/3.3V |
| 75 | ON/32.768KHZ | OFF | ON/1.5V | ON/2.7V | OFF |
| 62 | ON/32.768KHZ | OFF | ON/1.5V | OFF | OFF |
| 47 | ON/5MHZ | ON/5V | OFF | ON/3.3V | ON/1.2V |
| 36 | ON/10MHZ | ON/1.8V | ON/1.8V | ON/3.3V | ON/1.2V |
| 24 | ON/10MHZ | ON/3.3V | ON/1.8V | ON/2.5V | OFF |
| 12 | OFF | OFF | ON/1.8V | ON/2.5V | OFF |
| NA | OFF | OFF | OFF | OFF | OFF |

| RESISTANCE VALUE (KΩ) | INTERNAL VOLTAGE | COUNT VALUE | CODE VALUE |
|---|---|---|---|
| NC | NA | 13 | $CODE_{13}$ |
| 154 | $V_{12}$ | 12 | $CODE_{12}$ |
| 140 | $V_{11}$ | 11 | $CODE_{11}$ |
| 127 | $V_{10}$ | 10 | $CODE_{10}$ |
| 110 | $V_9$ | 9 | $CODE_9$ |
| 100 | $V_8$ | 8 | $CODE_8$ |
| 91 | $V_7$ | 7 | $CODE_7$ |
| 75 | $V_6$ | 6 | $CODE_6$ |
| 62 | $V_5$ | 5 | $CODE_5$ |
| 47 | $V_4$ | 4 | $CODE_4$ |
| 36 | $V_3$ | 3 | $CODE_3$ |
| 24 | $V_2$ | 2 | $CODE_2$ |
| 12 | $V_1$ | 1 | $CODE_1$ |
| NA | 0 | 0 | $CODE_0$ |

Fig. 8

INTEGRATED CIRCUIT DEVICE CONFIGURATION

BACKGROUND

Integrated circuit (IC) devices such as microcontrollers and memory devices are widely used in electronic products. Different electronic products often operate at different values of operating parameters, such as different values of frequencies and voltages. Thus, an IC device designed to operate at specific operating parameter values of for a specific product may be unsuitable for another product.

BRIEF DESCRIPTION OF THE DRAWINGS

FIG. 7 is a chart illustrating an association between example resistance values of a resistor of FIG. 6 and values of example operating parameters of the device of FIG. 6, according to an embodiment of the invention.

FIG. 8 shows relationships among resistance values of a resistor of FIG. 6 and values of components of a device of FIG. 6, according to an embodiment of the invention.

DETAILED DESCRIPTION

One or more embodiments described herein include a device having operating parameters that can be configured to operate at different parameter values in different electronic products or systems. Thus, the same device can be used in different electronic products by selecting appropriate values of operating parameters of the device that suit the application of a particular product.

The device described herein includes at least one a conductive contact adapted to couple to an external resistor. The values of the operating parameters of the device can be selected by selecting an appropriate resistance value of the resistor.

The device includes an associated user viewable chart showing different operating parameters with different sets of parameter values and resistance values. The user of the device may view the chart to decide which particular set of parameter values suits a specific application for the device. From the same chart, the user may select the resistance value for the external resistor that corresponds to that particular set of parameter values. Then, the resistor with the selected resistance value can be coupled to a conductive contact of the device.

The device includes an initialization mode to determine the resistance value of the resistor and appropriately selects the parameter values based on the resistance value. To save power after the device determines the resistance value of the resistor, the device may disable at least a portion of a detection circuit used to determine the resistance value of the resistor. The device also includes other modes (e.g., a normal transfer mode) where it transfers information, such as data and address, to and from the device. The device may use the same conductive contact that it uses during the selection of the parameter values to transfer information with other device after the initialization mode.

The device may operate to determine the resistance value each time it enters the initialization mode (e.g., each time power is applied to the device) and identifies a predetermined code corresponding to the resistance value. Then, the device uses the code to select the parameter values. Alternatively, the device may operate to determine the resistance value only one time and identify a predetermined code corresponding to that resistance value. The device may permanently store the code in its memory (e.g., non-volatile memory) and then use the stored code to select the parameter values.

Figure 1:
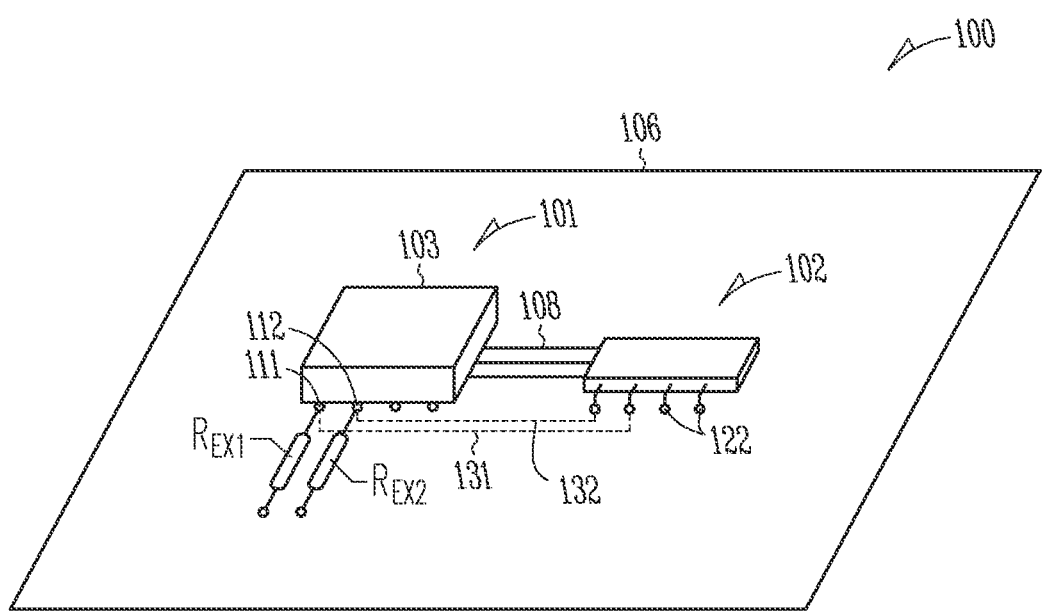
FIG. 1 shows a diagram of a system including IC devices, according to an embodiment of the invention.

FIG. 1 shows a diagram of a system 100 including devices 101 and 102, according to an embodiment of the invention. Devices 101 and 102 can include any combination of IC devices, such as processors, microcontrollers, and memory devices. System 100 can include, or be included in, electronic products such as computers, smart cards, radio frequency identification (RFID) devices, touch screens, security alarm systems, motion sensor systems, automobile sensing systems, digital thermostats, medical pacemakers, digital cameras, cellular phones, televisions, or other electronic products. One skilled in the art will readily recognize that system 100 includes other components, which are omitted from FIG. 1 to focus on the subject matter described herein.

As shown in FIG. 1, system 100 includes a base (e.g., a circuit board) 106 where devices 101 and 102 are located. Devices 101 and 102 may communicate with each other through conductive lines 108 formed on one portion (e.g., top) of base 106 and through conductive lines 131 and 132 formed on another portion (e.g., bottom) of base 106. Device 101 includes conductive contacts 111 and 112 to communicate with device 102 or with other components of system 100. Device 102 includes conductive contacts 122. FIG. 1 shows an example of conductive contacts 111 and 112 being solder balls and conductive contacts 122 being pins. Conductive contacts 111 and 112 can include pins or other conductive forms.

FIG. 1 shows conductive contacts 111 and 112 of device 101 being directly coupled to base 106 as an example. In some systems, conductive contacts 111 and 112 of device 101 can be indirectly coupled (e.g., coupled via a socket) to base 106. As shown in FIG. 1, device 101 includes an IC package 103 that encloses internal components (not shown) of device 101. IC package 103 can include material such as plastic or other encapsulation material used in IC device packaging.

As described above, IC devices 101 and 102 can be included in different electronic products, which may have different operating specifications. For example, different products may have different specified values for operating parameters such as operating frequencies, output voltages, device type (e.g., device platform), device power-up sequence, device default settings, and other operating parameters. Thus, depending on which product associated with system 100, device 101 can have different configurations. For example, in one product, device 101 can be configured to have certain values for a certain group of operating parameters. In another product, however, device 101 can be configured to have different values either for that same group of operating parameters or for different group of operating parameters. Configuring a device herein, such as device 101, includes causing internal components of the device to operate based on certain specification associated with the system in which the device is located. For example, if system 100 is designed to operate at specific values of operating frequency, output voltage, or both, then internal components of device 101 can be configured to operate at those values. In FIG. 1, device 101 can be configured such that it can operate at one or more specific operating parameter values based on the application of system 100.

System 100 also includes resistors $R_{EX1}$ and $R_{EX2}$ coupled to device 101 through conductive contacts 111 and 112, respectively. As shown in FIG. 1, resistors $R_{EX1}$ and $R_{EX2}$ are external to device 101, such that they are not enclosed by IC package 103 of device 101. The values of each of resistors $R_{EX1}$ and $R_{EX2}$ can be selected in order to select values of operating parameters of device 101. Detailed selection of the values of operating parameters based on the values of resistors $R_{EX1}$ and $R_{EX2}$ are further described below with reference to FIG. 2 and FIG. 3.

In FIG. 1, device 101 is associated with a device specification listing different selectable configurations that a user may select to operate device 101 at the selected configuration. The device specification also lists different values of one or more external resistors (e.g., resistors $R_{EX1}$ and $R_{EX2}$ in FIG. 1) that can be coupled to conductive contacts of device 101. By selecting the value for one or more external resistors, the user may configure device 101 to suit the application of system 100.

Figure 2:
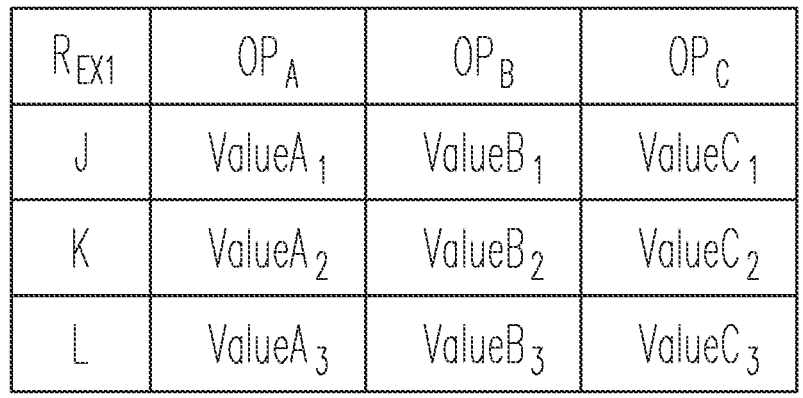
FIG. 2 is a chart illustrating an association between resistance values of a resistor of FIG. 1 and values of a group of operating parameters of an IC device of FIG. 1, according to an embodiment of the invention.

FIG. 2 is a chart 200 illustrating an association between resistance values of resistor $R_{EX1}$ of FIG. 1 and values of operating parameters of device 101 of FIG. 1, according to an embodiment of the invention. Chart 200 can be included as part of the device specification (known to a user) or public literatures associated with device 101. Chart 200 shows three operating parameters $OP_A$, $OP_B$, and $OP_C$ with corresponding values $ValueA_1$, $ValueB_1$, $ValueC_1$, $ValueA_2$, $ValueB_2$, $ValueC_2$, $ValueA_3$, $ValueB_3$, and $ValueC_3$. These values can be organized into different sets 201, 202, and 203 of parameter values. Each of the values in chart 200 can be a numerical value (e.g., frequency or voltage value) or a status value (e.g., ON state or OFF state) of the corresponding operating parameter. Chart 200 shows three operating parameters $OP_A$, $OP_B$, and $OP_C$ and three sets 201, 202, and 203 of parameter values, as an example. The number of operating parameters and sets of parameter values in chart 200 can vary. For example, chart 200 may include only one operating parameter, two operating parameter values, or more than three operating parameter values.

In chart 200, values J, K, and L represent different resistance values (in ohm unit) of resistor $R_{EX1}$ in FIG. 1. Based on the application of system 100, a user may select any one of values J, K, and L in order to select one of sets 201, 202, and 203 of parameter values of operating parameters $OP_A$, $OP_B$, and $OP_C$. For example, if a user prefers to operate device 101 according to parameter value set 201, then the user may select a resistance value of J ohms for resistor $R_{EX1}$ because resistance value J is associated with set 201.

Figure 3:
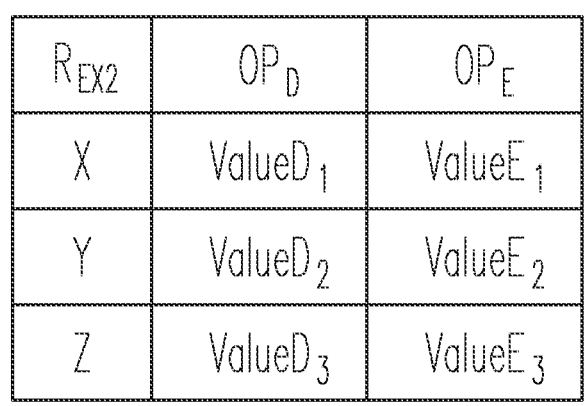
FIG. 3 is another chart illustrating an association between resistance values of a resistor of FIG. 1 and values of another group of operating parameters of an IC device of FIG. 1, according to an embodiment of the invention.

FIG. 3 is a chart 300 illustrating an association between resistance values of resistor $R_{EX2}$ of FIG. 1 and values of another group operating parameters $OP_D$ and $OP_E$ of device 101 of FIG. 1, according to an embodiment of the invention. Similarly to chart 200 of FIG. 2, chart 300 of FIG. 3 can be included as part of the device specification or public literatures associated with device 101. In chart 300, operating parameters $OP_D$ and $OP_E$ are additional operating parameters of device 101, different from operating parameters $OP_A$, $OP_B$, and $OP_C$ of chart 200 of FIG. 2. Operating parameters $OP_D$ and $OP_E$ in chart 300 have values indicated by values $ValueD_1$, $ValueE_1$, $ValueD_2$, $ValueE_2$, $ValueD_3$, and $ValueE_3$. These values can be organized into different sets 301, 302, and 303 of parameter values. Similarly to chart 200, each of the values in chart 300 can include a numerical value or a status value. FIG. 3 shows two operating parameters $OP_D$ and $OP_E$ and three sets 301, 302, and 303 of parameter values, as an example. The number of operating parameters and sets parameter values in chart 300 can vary. For example, chart 300 may include only one operating parameter, two operating parameter values, or more than three operating parameter values.

Chart 300 also includes values X, Y, and Z representing different resistance values (in ohm unit) of resistor $R_{EX2}$. Based on the application of system 100, any one of values X, Y, and Z can be selected to select one of sets 301, 302, and 303 of parameter values of operating parameters $OP_D$ and $OP_E$. For example, in additional to one of sets 201, 202, and 203 of chart 200 of FIG. 2, if a user prefers to operate device 101 according to set 303 of parameter values of chart 300, then the user may select a resistance value of Z ohms from chart 300 for resistor $R_{EX2}$.

In FIG. 1, although two resistors $R_{EX1}$ and $R_{EX2}$ can be coupled to device 101 to select two different sets (e.g., one of sets 201, 202, and 203 in FIG. 2 and one of sets 301, 302, and 303 in FIG. 3) of values of the operating parameters shown in FIG. 2 and FIG. 3, one of resistors $R_{EX1}$ and $R_{EX2}$ can be omitted from (unconnected to) system 100. In such case, only one of resistors $R_{EX1}$ and $R_{EX2}$ is coupled to device 101. Thus, device 101 may operate at selected values associated with the resistor (e.g., $R_{EX1}$) coupled to device 101 and at default values of operating parameters associated with the omitted resistor (e.g., $R_{EX2}$). Alternatively, both of resistors $R_{EX1}$ and $R_{EX2}$ can be omitted from system 100. In such case, device 101 may operate at default values of operating parameters of device 101.

The above description with reference to FIG. 1, FIG. 2, and FIG. 3, describes device 101 including two different conductive contacts 111 and 112, such that two different resistors $R_{EX1}$ and $R_{EX2}$ can be respectively coupled to conductive contacts 111 and 112. Then, device 101 selects two different sets of parameter values of two different groups of operating parameters of device 101 based on values of resistors $R_{EX1}$ and $R_{EX2}$. Device 101, however, can have only one conductive contact (e.g., one of conductive contacts 111 and 112) at which only one external resistor can be coupled to that conductive contact to select one set of parameter values of a group of operating parameters of device 101. Alternatively, device 101 can have more than two conductive contacts at which more than two external resistors can be respectively coupled to those conductive contacts to select more than two sets of parameter values of more than groups of operating parameters of device 101.

Figure 4:
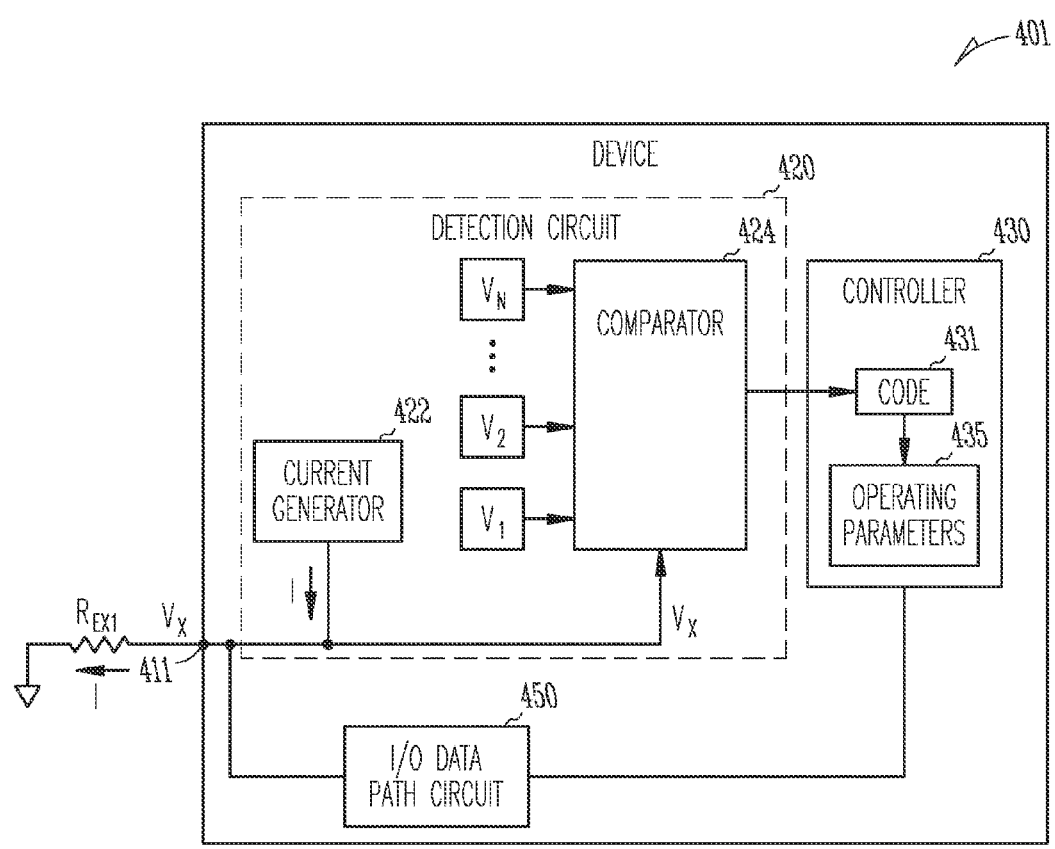
FIG. 4 shows a schematic diagram of a device including a detection circuit to determine a resistance value of a single resistor externally coupled to the device, according to an embodiment of the invention.

FIG. 4 shows a schematic diagram of a device 401 including a detection circuit 420 to determine a resistance value of a resistor $R_{EX1}$ externally coupled to a conductive contact 411 of the device, according to an embodiment of the invention. Device 401 can correspond to device 101 of FIG. 1. In FIG. 4, resistor $R_{EX1}$ has a resistance value selected by a user based on a chart included in the specification that lists the association between a number of possible different resistance values of resistor $R_{EX1}$ and corresponding values of operating parameters of device 401, such as operating parameters 435 shown in FIG. 4.

Device 401 operates to determine the resistance value of resistor $R_{EX1}$ in order to appropriately select values of operating parameters 435 inside device 401. During an initialization mode (e.g., during a startup mode), a current generator 422 of detection circuit 420 passes a current I to a circuit path between conductive contact 411 and a circuit node 499 (e.g., ground contact). Thus, conductive contact 411 has a voltage $V_X$ during the initialization mode. Voltage $V_X$ is a function of a value of current I and a resistance value resistor $R_{EX1}$ (i.e., $V_X = I * R_{EX1}$). Since $V_X = I * R_{EX1}$, and resistor $R_{EX1}$ can have a number of different values, voltage $V_X$ can also have a number of different values, one for each resistance value resistor $R_{EX1}$.

Device 401 includes internal voltages $V_1$ and $V_2$ through $V_N$ with different known values. N is the total number of voltages $V_1$ through $V_N$. Each of voltages $V_1$ through $V_N$ corresponds to a unique value of a code (CODE) 431. Thus, code 431 can have N different unique values corresponding to different values of voltages $V_1$ through $V_N$. The values of voltages $V_1$ through $V_N$ can be set to correspond to all possible values of voltage $V_X$. Among voltages $V_1$ through $V_N$, voltage $V_1$ may have a lowest value and voltage $V_N$ may have a highest value.

During the initialization mode, a comparator 424 may successively compares voltages $V_1$ through $V_N$ with voltage $V_X$ to determine the value of voltage $V_X$. When a value of voltage $V_X$ is determined, controller 430 identifies a specific value of the code corresponding to the value voltage $V_X$. Then, controller 430 uses the identified value of the code to select values of operating parameters. As an example, during an initialization mode, comparator 424 may perform a first comparison to compare voltage $V_1$ with voltage $V_X$. If a comparison result indicates that the value of voltage $V_1$ is less than the value of voltage $V_X$, then comparator 424 performs a next comparison to compare voltage $V_2$ with voltage $V_X$. If the comparison result indicates that the value of voltage $V_2$ is less than the value of voltage $V_X$, then comparator 424 continues to perform one or more additional comparisons to compare the other remaining internal voltages ($V_3$ through $V_N$) with voltage $V_X$. Comparator 424 performs the comparisons until the comparison result indicates that a value of one the remaining internal voltages is equal to or greater than the value of voltage $V_X$. When that occurs, controller 430 causes comparator 424 to stop. Then, controller 430 identifies a value of code 431 that corresponds to the voltage (among $V_3$ through $V_N$ in this example) that is equal to or greater than $V_X$. Then, controller 430 uses the identified value of code 431 to select values of operating parameters 435.

Device 401 may disable all or a portion of detection circuit 420 after the selection of the values of operating parameters 435 to save power. After the initialization mode, device 401 may use conductive contact 411 (with resistor $R_{EX1}$ coupled to it) as a digital pull-down input/output (I/O) conductive contact.

As shown in FIG. 4, device 401 also includes an input/output (I/O) data path circuit 450. After the initialization mode, device 401 may use I/O data path circuit 450 and to transfer data to and from device 401 through conductive contact 411. Data path circuit 450 may include a transceiver (not shown) having an output driver to send data to another device from device 401 through conductive contact 411 and an input driver to receive data from another device through conductive contact 411. Thus, in device 401, conductive contact can be used as both to transfer information to and from device 401 and to identify a resistance value of an external resistor (e.g., resistor $R_{EX1}$) coupled to it to select values of operating parameters of device 401.

Figure 5:
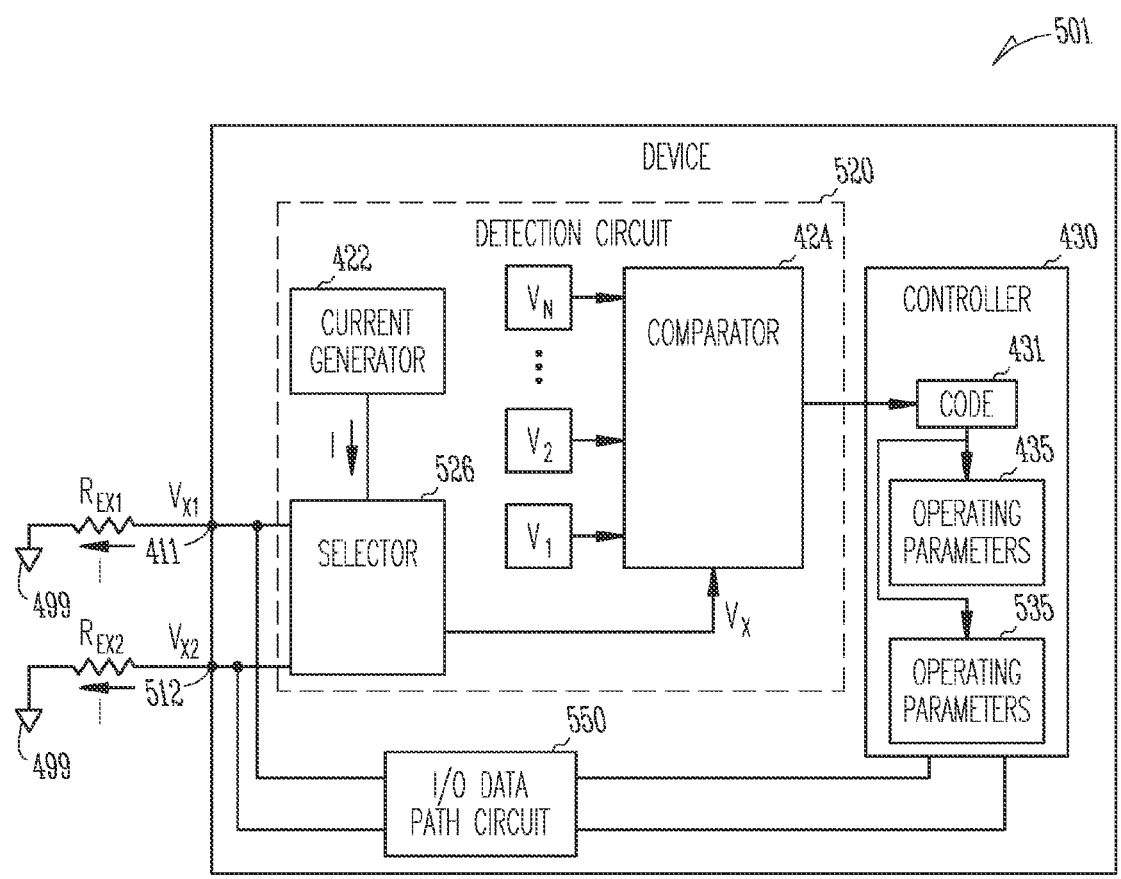
FIG. 5 shows a schematic diagram of a device including a detection circuit to determine resistance values of multiple resistors externally coupled to the device, according to an embodiment of the invention.

FIG. 5 shows a schematic diagram of a device 501 including a detection circuit 520 to determine resistance values of resistors $R_{EX1}$ and $R_{EX2}$ externally coupled to conductive contacts 411 and 512 of the device, according to an embodiment of the invention. Device 501 can correspond to device 101 of FIG. 1. As shown in FIG. 4 and FIG. 5, devices 401 and 501 include similar components. Thus, for simplicity, the similar components are designated by the same reference labels.

Some of the differences between devices 401 and 501 include an additional resistor $R_{EX2}$ coupled to an additional conductive contact 512 of device 501, and a selector 526 in device 501 having inputs coupled to both conductive contacts 411 and 512. Resistor $R_{EX2}$ enables a user of device 501 to select values of additional operating parameters 535. Selector 526 selectively applies voltages $V_{X1}$ and $V_{X2}$ at different time intervals during an initialization mode of device 501 to comparator 424 as voltage $V_X$.

Device 501 selects values of among operating parameters 435 in ways similarly to those described above with reference to FIG. 4. For example, during a time interval of an initialization mode of device 501, selector 526 may select voltage $V_{X1}$ and applies it to comparator 424 as voltage $V_X$. Based on the comparison between at least one of voltages $V_1$ through $V_N$ with voltage $V_X$ (which is $V_{X1}$ in this time interval), controller 430 appropriately identifies a value of code 431 and selects corresponding values of operating parameters 435. Then, during another time interval within the same initialization mode, selector 526 selects voltage $V_{X2}$ and applies it to comparator 424 as voltage $V_X$. Based on the comparison between at least one of voltages $V_1$ through $V_N$ with voltage $V_X$ (which is $V_{X2}$ in this time interval), controller 430 appropriately identifies another value of code 431 and selects corresponding values of operating parameters 535.

Device 501 may disable all or a portion of detection circuit 520 after the selection of the values of operating parameters 435 and 535 to save power. After the initialization mode, device 501 may use conductive contact 411 (with resistor $R_{EX1}$ coupled to it) and conductive contact 512 (with resistor $R_{EX2}$ coupled to it) as digital pull-down input/output (I/O) conductive contacts.

As shown in FIG. 5, device 501 also includes an I/O data path circuit 550. After the initialization mode, device 501 may use I/O data path circuit 550 to transfer data to and from device 401 through conductive contacts 411 and 512.

Current generator 422 may pass current I to a circuit path between conductive contact 411 and a circuit node 499 during a time interval of an initialization mode to generate voltage $V_{X1}$. Thus, voltage $V_{X1}$ is a function of a value of current I and a resistance value resistor $R_{EX1}$ (i.e., $V_{X1} = I * R_{EX1}$). Current generator 422 may also pass current I to another circuit path between conductive contact 512 and a circuit node 499 during another time interval of the initialization mode to generate voltage $V_{X2}$. Thus, voltage $V_{X2}$ is a function of the value of current I and a resistance value resistor $R_{EX2}$ (i.e., $V_{X2} = I * R_{EX2}$).

FIG. 5 shows an example where two external resistors ($R_{EX1}$ and $R_{EX2}$) are coupled to device 501 to select values of two different groups of operating parameters (operating parameters 435 and 535). Device 501 can include more than two conductive contacts where more than two external resistors can be coupled to those conductive contacts to select values of more than groups of operating parameters. For example, device 501 can include eight conductive contacts where eight external resistors can be coupled to those eight conductive contacts to select values of eight different groups of operating parameters. In this example, selector 526 can include 8-to-1 multiplexer with eight inputs respectively coupled to those eight conductive contacts. Selector 526 can selectively apply voltages from those eight conductive contacts during an initialization mode for comparisons with internal voltages of device 501 to select eight different values of a code, such as code 431. In this example, controller 430 may appropriately select values of eight groups of operating parameters based on the eight different values of the code.

Figure 6:
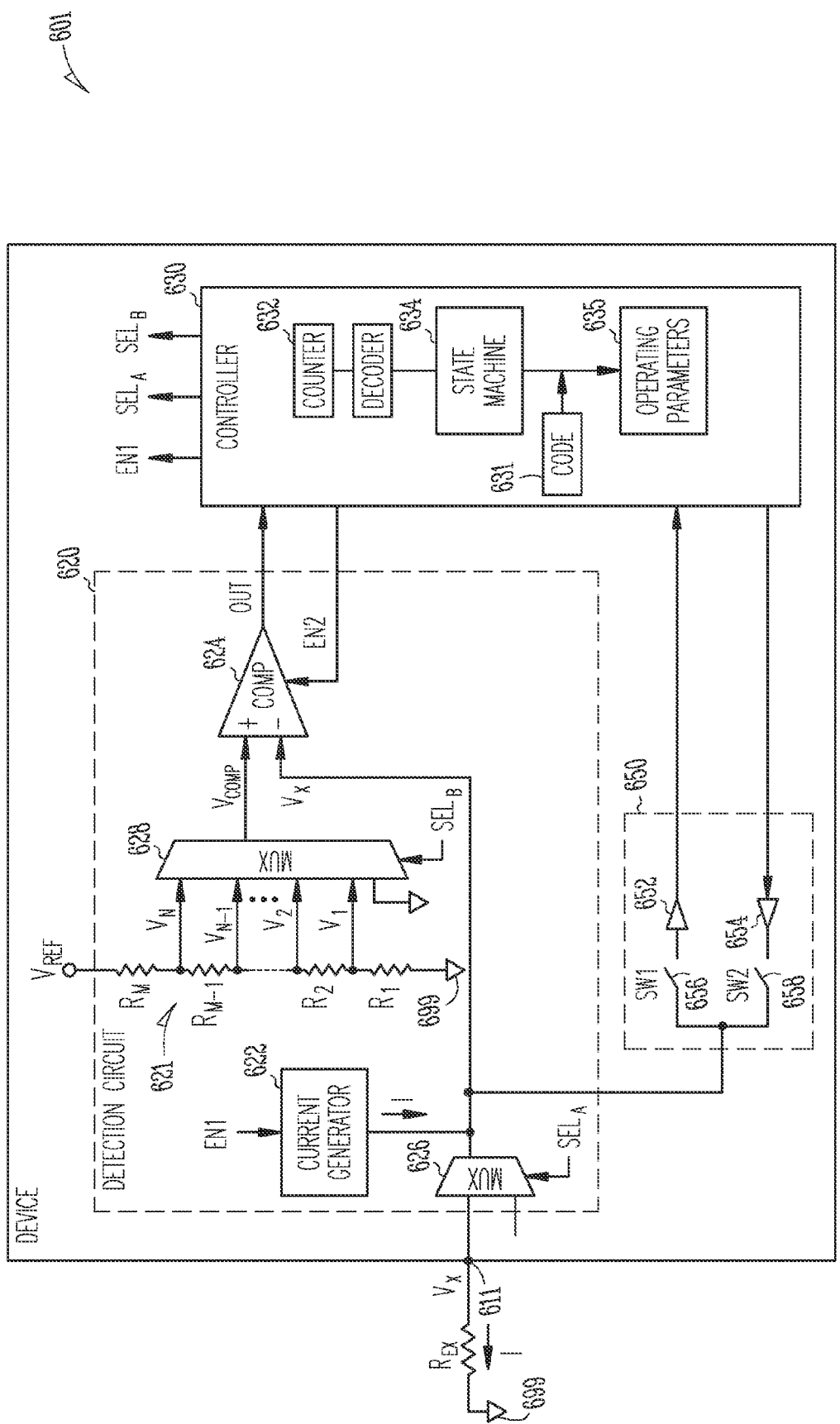
FIG. 6 shows a schematic diagram of a device including a detection circuit with a resistor network, according to an embodiment of the invention.

FIG. 6 shows a schematic diagram of a device 601 including a detection circuit 620 with a resistor network 621, according to an embodiment of the invention. Device 601 can correspond to device 101 of FIG. 1, device 401 of FIG. 4, or device 501 of FIG. 5. Device 601 of FIG. 6 includes a conductive contact 611 that can be coupled to a resistor, such as resistor $R_{EX}$. A user may select a resistance value of resistor $R_{EX}$ based on a chart (e.g., chart 700 of FIG. 7) included in the specification that lists the association between a number of resistance values of resistor $R_{EX}$ and corresponding values of operating parameters 635 of device 601. Device 601 operates to select parameter values of operating parameters 635 based on user's selected resistance value of resistor $R_{EX}$ as follows.

During an initialization mode of device 601, a current generator 622 of detection circuit 620 passes a current I to a circuit path between conductive contact 611 and a circuit node 699. Thus, at node 611, $V_X = I*R_{EX}$ during the initialization mode. Current I can be temperature-compensated current, so that voltage $V_X$ can be less susceptible to variations in operating temperature for improved accuracy in determining the resistance value of resistor $R_{EX}$. Device 601 determines the value of voltage $V_X$ in order to determine the resistance value of resistor $R_{EX}$. Since $V_X = I*R_{EX}$ and since resistor $R_{EX}$ can have a number (e.g., P, where P is at least one) of possible selectable resistance values, voltage $V_X$ would also have the same number (e.g., P) of possible voltage values.

As shown in FIG. 6, device 601 can generate a reference voltage $V_{REF}$ and apply it to a resistor network 621 including resistors $R_1$ through $R_M$. M is the total number of the resistors ($R_1$ through $R_M$) coupled in series between the node having the reference voltage $V_{REF}$ and circuit node 699. Resistor network 621 provides N different internal voltages. For clarity, FIG. 6 shows only some of the internal voltages including $V_1$, $V_2$, $V_{N-1}$, and $V_N$.

The values resistors $R_1$ through $R_M$ can be selected such that the voltage values of voltages $V_1$ through $V_N$ correspond to all possible values of voltage $V_X$. The total number of internal voltages (N) is dependent on the total number M of resistance values of resistor $R_{EX}$. For example, if there is a total of 12 resistance values, then the total number of voltages $V_1$ through $V_N$ is 12 (N=M=12). By selecting appropriate resistance values of resistors $R_1$ through $R_M$, each value of voltage $V_1$ through $V_N$ in FIG. 6 can be equal to the value of current I and a different resistance value of resistor $R_{EX}$.

The precision in values of voltages $V_1$ through $V_N$ may depend on manufacturing variations in values of resistors $R_1$ through $R_M$. Each of resistors $R_1$ through $R_M$ can have a 1% (or less) deviation from its expected value due to manufacturing variations. The 1% (or less) variations in values of resistors $R_1$ through $R_M$ can be negligible when device 601 operates to determine the value of voltage $V_X$.

During the initialization mode, a multiplexer (MUX) 626, in response to a control information $SEL_A$, selects voltage $V_X$ and applies it to an input (e.g., "−" input) of comparator 624. Multiplexer 628, in response to select control information $SEL_B$, selects one of the voltages $V_1$ through $V_N$ and applies the selected voltage to another input (e.g., "+" input) of comparator 624. Comparator 624 compares the selected voltage (one of $V_1$ through $V_N$) with voltage $V_X$ and provides a comparison result OUT with a value based on the comparison. For example, if the value of the selected internal voltage being compared is less than the value of voltage $V_X$, then comparison result OUT may remain at the same value (value before the comparison), such as the same state (e.g., same signal level). If the value of the selected internal voltage being compared is equal to or greater than the value of voltage $V_X$, then comparison result OUT changes its value, such as changing from one state to another state (e.g., changing from one signal level to another signal level). During the initialization mode, multiplexer 628 may successively apply voltages $V_1$ through $V_N$ to comparator 624. In turn, comparator 624 may successively compare voltages $V_1$ through $V_N$ with voltage $V_X$ until one of voltages $V_1$ through $V_N$ is equal to or greater than voltage $V_X$. When that occurs, comparison result OUT may change its value, indicating that a selected voltage (one of voltages $V_1$ through $V_N$) being compared is equal to or greater than voltage $V_X$.

Controller 630 may cause comparator 624 to stop performing the comparison when comparison result OUT of comparator 624 changes value. Then, controller 630 selects values of operating parameters based on a comparison result OUT, as follows.

At the beginning of the initialization mode, a counter 632 may reset (e.g., reset to zero). Then, counter 632 may change (e.g., increase) its count each time comparator 624 compares voltage $V_X$ with one of the voltages $V_1$ through $V_N$. When comparison result OUT of comparator 624 changes value, indicating that the value of $V_X$ is determined, controller 630 may store the count value of counter 632. Then, controller 630 selects a value of code 631 associated with the stored count value of counter 632. Based on the value of code 631 selected from the count value, state machine 634 selects values of operating parameters 635, which correspond to the values that were selected by the user in association with the resistance value of resistor $R_{EX}$.

Device 601 may disable all or a portion of detection circuit 620 after the selection of the values of operating parameters 635 to save power. After the initialization mode, device 601 may use conductive contact 611 (with resistor $R_{EX1}$ coupled to it) as a digital pull-down input/output (I/O) conductive contact.

As shown in FIG. 6, device 601 also includes an input/output (I/O) data path circuit 650. After the initialization mode, device 601 may use I/O data path circuit 650 to transfer data to and from device 601 through conductive contact 611. Data path circuit 650 includes an output driver 652 to send data to another through conductive contact 611 and an input driver 654 to receive data from another device through conductive contact 611. To receive data from another device, data path circuit 650 may turn on a switch 656 using a signal $SW_1$, turn off a switch 658 using a signal $SW_2$, and use input driver 652 to receive the data through conductive contact 611. To send data to another device, data path circuit 650 may turn on switch 658 using signal $SW_2$, turn off switch 656 using signal $SW_1$, and use output driver 654 to send data from device 601 through conductive contact 611.

Detect circuit 620 may operate to determine the resistance value of resistor $R_{EX}$ each time device 601 goes through the initialization mode, such as each time power is applied to device 601. Alternatively, detect circuit 620 may operate to determine the resistance value of resistor $R_{EX}$ only one time (e.g., during an initialization mode of device 601). Then, device 601 may permanently store the value of code 631 in non-volatile memory of device 601. Device 601 may use the stored code to select values of the operating parameters of device 601 without going through the detection operation a second time to determine the resistance value of resistor $R_{EX}$.

In FIG. 6, device 601 includes one conductive contact 611 where one resistor (e.g., resistor $R_{EX}$) can be coupled to conductive contact 611 to select values of a group of operating parameters. Alternatively, device 601 can include two or more conductive contacts where two or more external resistors can be coupled to those conductive contacts to select values of two or more groups of operating parameters. For example, if device 601 includes a number (e.g., C, where C is at least two) of conductive contacts, then up to C external resistors can be coupled to those C conductive contacts. In this example, MUX 626 can include a C-to-1 MUX with C inputs respectively coupled to the C conductive contacts. The number of different sets of values that can be selected for operating parameters of device in this example is equal to the total number of resistance values of all external resistors coupled to the C conductive contacts. For example, if eight external resistors are respectively coupled to the C conductive contacts and if there are 13 cases associated with each external resistor that device 601 can be used, then there would be 13 times C (13×C) different sets of values that can be selected for operating parameters of device 601. Thus, in this example, if C=8, then same device can be used in 104 (13×8=104) different applications or systems.

FIG. 7 is a chart 700 illustrating an association between example resistance values of resistor $R_{EX}$ of FIG. 6 and values of example operating parameters of device 601 of FIG. 6, according to an embodiment of the invention. Chart 700 shows example operating parameters, including an oscillator and frequency, a direct current to direct current (DCDC) regulator output voltage, and three low dropout ($LDO_1$, $LDO_2$, and $LDO_3$) output voltages. As shown in FIG. 7, the values of the operating parameters can be a numerical value (e.g., 1.8 volts (1.8V)) or a state (e.g., ON state or OFF state). These values are organized into 14 different sets from set 701 to set 713. The user may select a particular set among sets 701 through 713 of values of by selecting the corresponding resistance value associated with that particular set. For example, if the user prefers to operate device 601 with the values in set 706, then the user would select 100 KΩ as the value for resistor $R_{EX}$.

As shown in chart 700, the 13 cases include 12 selectable resistance values and one "NC" value. Value "NC" refers to a case where resistor $R_{EX}$ of FIG. 6 can be omitted or "not connected" to device 601. Among the 13 cases in chart 700, a user may either select one of the 12 resistance values (in kilohms, KΩ) for resistor $R_{EX}$ or omit (does not use) resistor $R_{EX}$. If resistor $R_{EX}$ is omitted, then device 601 may operates at the default values of the operating parameters, such as values of set 701. In chart 700, the value "na" is not applicable for the user to select. This "na" value refers to a case where device 601 may reset value of counter 632 to zero at the beginning of the initialization mode before comparing operation to determine the resistance value resistor $R_{EX}$.

In the example of chart 700 in FIG. 7, since a user may select one of the 13 sets 701 through 713 of values to operate device 601, the same device 601 can be used in 13 different applications by appropriately selecting the values of the external resistor (e.g., $R_{EX}$ of FIG. 6). FIG. 7 shows an example of 13 cases with a total number of 12 different resistance values. The total number of resistance values and the resistance values can vary.

FIG. 8 shows relationships among resistance values of resistor $R_{EX}$ of FIG. 6 and values of components of device 601 including internal voltages $V_1$ through $V_{12}$, count values of counter 632, and values of code 631, according to an embodiment of the invention. As described above with reference to chart 700 of FIG. 7, the user of device 601 may select appropriate values of the operating parameters in chart 700 by selecting a corresponding resistance value of resistor $R_{EX}$ listed in chart 700. The relationship shown in FIG. 8, which may be unknown to the user. During an initialization mode, device 601 uses the relationships shown in FIG. 8 to obtain the resistance value of resistor $R_{EX}$ in order to select the values of operating parameters of device 60.

FIG. 8 shows 12 voltages $V_1$ through $V_{12}$ to indicate that N can be equal to 12 in FIG. 6. As described above, each value of voltage $V_1$ through $V_N$ in FIG. 6 is equal to the value of current I and a different resistance value of resistor $R_{EX}$. Thus, based on FIG. 8, $V_1$=I*12KΩ; $V_2$=I*24 KΩ; $V_3$=I*36 KΩ, and so on. Device 601 determines the resistance value of resistor $R_{EX}$ based on the relationships shown in FIG. 8. For example, if the user selects 100 KΩ as the value for resistor $R_{EX}$, then comparator 624 may stop at after it successively comparing voltages $V_1$ through $V_8$ ($V_8$ is not shown in FIG. 6, but it is between $V_2$ and $V_{N-1}$) with voltage $V_X$ (FIG. 6) because voltage V8 is associated with resistance value of 100 KΩ, based on FIG. 8. Since voltage $V_8$ is associated with the count value 8 and a code value of CODE8, controller 630 of FIG. 8 uses the value of CODE8 to set the state machine 634 to appropriately select the values of operating parameters 635.

Based on the example relationships shown in FIG. 8, if $V_{REF}$ in FIG. 6 has a value of 1.8 volts, then the value of current I can be selected such that with a maximum resistance value of resistor $R_{EX}$, I*$R_{EX}$ can be close to but less than the value of $V_{REF}$ (I*$R_{EX}$<$V_{REF}$). Thus, if $V_{REF}$ is about 1.8 volts and the maximum resistance value of resistor $R_{EX}$ is about 154 KΩ (as shown in chart 700 or in FIG. 8), then the value of current I can be selected such that I×154 KS)<1.8 volts, or the value of current I can be about 10 microamperes (μA).

Figure 9:
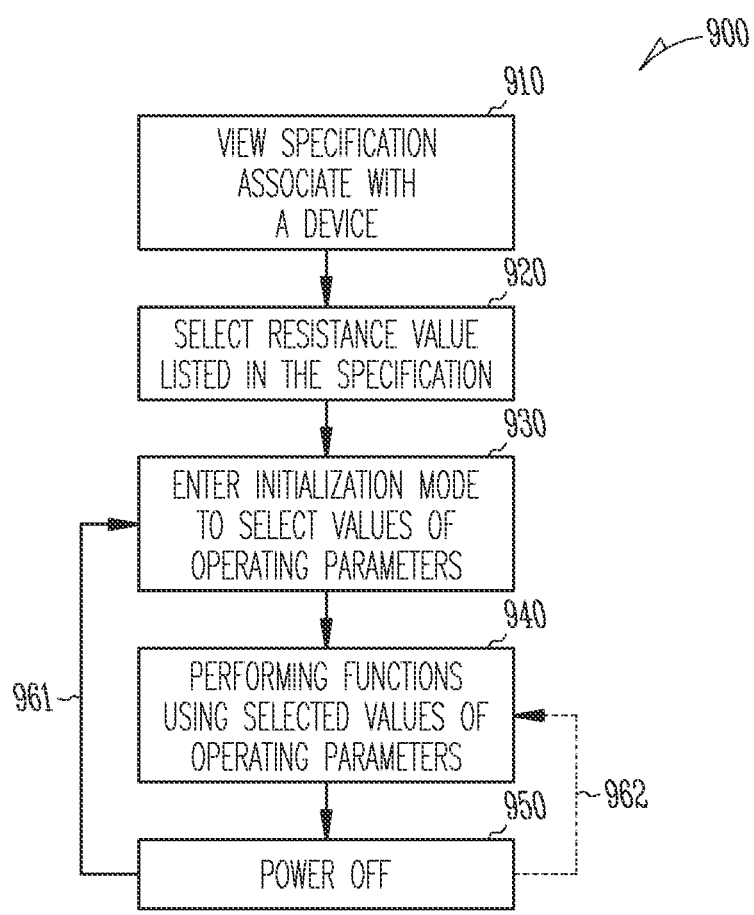
FIG. 9 is a flowchart showing a method of operating a device, according to an embodiment of the invention.

FIG. 9 is a flowchart showing a method 900 of operating a device, according to an embodiment of the invention. Method 900 may be used in a system that is similar to or identical to system 100 of FIG. 1. Thus, the device used in method 900 may include the device described above with reference to FIG. 1 through FIG. 8.

In FIG. 9, activity 910 of method 900 may include viewing a specification associated with the device. The specification may include at least one chart similar to chart 200, 300, and 700 described above with reference to FIG. 1 through FIG. 7. Activity 920 in FIG. 9 may include selecting resistance value listed in one or more charts associated with the device in order to select values of operating parameters of the device. Activities 910 and 920 can be performed by a user of the device.

Activity 930 may include entering an initialization mode to select values of operating parameters of the device. Activity 930 may include activities and operations of device 101, 401, 501, and 601 described above with reference to FIG. 1 through FIG. 8.

Activity 940 in FIG. 9 may include performing functions using the selected values of operating parameters of the device. The functions may be performed after the initialization mode and may include transfer information to and from the device. The information may be transferred through the same conductive contacts that are used during selection of the values of operating parameters of the device. Activities 930 and 940 are performed by the device.

Activity 950 may include turning off power to the device. For example, activity 950 may cut off supply power to the device. A next time power is applied to the device, the device may repeat activity 930 via activity loop 961 to select values of operating parameters of the device. Alternatively, the device may skip repeating activity 930 and follow activity loop 962 to perform functions using the select values of operating parameters that were already selected in activities 930. The device may follow activity loop 962 when the device permanently stores the code used to select values of the operating parameters.

Method 900 may include other activities similar to or identical to the activities described above with reference to FIG. 1 and FIG. 8. Various embodiments may have more or fewer activities than those illustrated in FIG. 9.

The illustrations of apparatus (e.g., system 100 and devices 401, 501, and 601) are intended to provide a general understanding of the structure of various embodiments and are not intended to provide a complete description of all the components and features of apparatus and systems that might make use of the structures described herein.

Any of the components described above can be implemented in a number of ways, including simulation via software. Thus, apparatus (e.g., system 100 and devices 401, 501, and 601) described above may all be characterized as "modules" (or "module") herein. Such modules may include hardware circuitry, single and/or multi-processor circuits, memory circuits, software program modules and objects and/or firmware, and combinations thereof, as desired by the architect of the apparatus (e.g., system 100 and devices 401, 501, and 601) and as appropriate for particular implementations of various embodiments. For example, such modules may be included in a system operation simulation package, such as a software electrical signal simulation package, a power usage and distribution simulation package, a capacitance-inductance simulation package, a power/heat dissipation simulation package, a signal transmission-reception simulation package, and/or a combination of software and hardware used to operate or simulate the operation of various potential embodiments.

The apparatus and systems of various embodiments may include or be included in electronic circuitry used in high-speed computers, communication and signal processing circuitry, single or multi-processor modules, single or multiple embedded processors, multi-core processors, data switches, and application-specific modules including multilayer, multi-chip modules. Such apparatus and systems may further be included as sub-components within a variety of electronic systems, such as televisions, cellular telephones, personal computers (e.g., laptop computers, desktop computers, handheld computers, tablet computers, etc.), workstations, radios, video players, audio players (e.g., MP3 (Motion Picture Experts Group, Audio Layer 3) players), vehicles, medical devices (e.g., heart monitors, blood pressure monitors, etc.), set top boxes, motion detectors, temperature sensors, and others.

One or more embodiments described herein include apparatus, systems, and methods having a conductive contact, a circuit to determine a resistance value of a circuit path between the conductive contact and a circuit node during an initialization mode of the device, and a controller to select at least one value of at least one operating parameter of the device based at least in part on the resistance value. Other embodiments including additional apparatus, systems, and methods are described above with reference to FIG. 1 through FIG. 9.

The above description and the drawings illustrate some embodiments of the invention to enable those skilled in the art to practice the embodiments of the invention. Other embodiments may incorporate structural, logical, electrical, process, and other changes. In the drawings, like features or like numerals describe substantially similar features throughout the several views. Examples merely typify possible variations. Portions and features of some embodiments may be included in, or substituted for, those of other embodiments. Many other embodiments will be apparent to those of skill in the art upon reading and understanding the above description.

What is claimed is:

1. A device comprising:
a conductive contact;
a circuit node;
a detection circuit operatively coupled to the conductive contact; and
a controller operatively coupled to the detection circuit and to the conductive contact, wherein:
during an initialization mode of the device, the detection circuit determines a resistance value of a circuit path between the conductive contact and the circuit node, and the controller selects a value of an operating parameter of the device based in part on the determined resistance value, and
after completion of the initialization mode of the device, the device uses the selected value of the operating parameter to perform one or more functions, disables at least a portion of the detection circuit, and uses the conductive contact as an input/output (I/O) contact for the controller.

2. The device of claim 1, wherein the conductive contact is adapted to couple to the circuit node through a resistor, such that the resistance value of the circuit path includes a resistance value of the resistor.

3. The device of claim 1, further comprising an additional conductive contact, wherein:
the detection circuit is further adapted to determine an additional resistance value of an additional circuit path between the additional conductive contact and the circuit node during the initialization mode of the device, and
the controller is further adapted to select, during the initialization mode of the device, an additional value of an additional operating parameter of the device based at least in part on the determined additional resistance value.

4. The device of claim 1, further comprising a ground contact to couple to the circuit node.

5. The device of claim 1, wherein the conductive contact includes one of a solder ball and an integrated circuit pin.

6. A device comprising:
a conductive contact;
a circuit node;
a detection circuit operatively coupled to the conductive contact; and
a controller operatively coupled to the detection circuit and to the conductive contact, wherein:
during an initialization mode of the device, the detection circuit obtains a voltage value of a voltage at the conductive contact, and the controller selects a value of an operating parameter of the device based in part on the obtained voltage value, and
after completion of the initialization mode of the device, the device uses the selected value of the operating parameter to perform one or more functions, disables at least a portion of the detection circuit, and uses the conductive contact as an input/output (I/O) contact for the controller.

7. The device of claim 6, wherein the detection circuit is adapted to pass a current through the conductive contact during the initialization mode, such that the obtained voltage value is a function of a value of the current and a resistance value of a circuit path between the conductive contact and a ground contact.

8. The device of claim 6, further comprising an additional conductive contact, wherein:
the detection circuit is further adapted to obtain an additional voltage value of an additional voltage at the additional conductive contact during the initialization mode of the device, and
the controller is further adapted to select, during the initialization mode of the device, additional values of the operating parameters of the device based at least in part on the obtained additional voltage value.

9. The device of claim 6, wherein the detection circuit includes a comparator, wherein:
the comparator compares the voltage value of the voltage at the conductive contact with a voltage value of an internal voltage in the device and provides a result of the comparison to the controller, and
the controller is adapted to select a value of a code based on the comparison result and uses the value of the code to select the value of the operating parameter of the device.

10. The device of claim 9, wherein the detection circuit further comprises a selector that selects the internal voltage from a plurality of internal voltages in the device.

11. The device of claim 10, wherein the conductive contact is included in multiple contacts of the device, and the detection circuit further includes an additional selector to provide voltages from the multiple conductive contacts to the comparator.

12. The device of claim 9, further comprising a counter to provide a count value based on a number of comparisons performed by the comparator, wherein the value of the code corresponds to the count value.

13. The device of claim 7, further comprising:
a transfer path coupled to the conductive contact and separate from the circuit path, the transfer path adapted to send information to the device through the conductive contact after the completion of the initialization mode.

14. The device of claim 13, wherein the circuit path is further adapted to receive information from the device through the conductive contact after the completion of the initialization mode.

15. The device of claim 6, further comprising an integrated circuit package, wherein the detection circuit and the controller are enclosed in the integrated circuit package and the conductive contact includes one of a solder ball and a pin included in the integrated circuit package.

16. A system comprising:
a conductive contact;
a resistor coupled to the conductive contact; and
a device coupled to the conductive contact, wherein the device:
includes a detection circuit and a controller,
is adapted to select a value of an operating parameter of the device based in part on a resistance value of the resistor,
during an initialization mode of the device, determines the resistance value of the resistor, and selects the value of the operating parameter, and
after completion of the initialization mode of the device, uses the selected value of the operating parameter to perform one or more functions, disables at least a portion of the detection circuit, and uses the conductive contact as an input/output (I/O) contact for the controller.

17. The system of claim 16, wherein the detection circuit includes:
a selector to select a conductive contact voltage, the conductive contact voltage being a function of a resistance value of the resistor and a value of a current provided by the device; and
a comparator to compare at least one selected voltage in the device with the conductive contact voltage selected by the selector to provide a comparison result and enable the device to select the operating parameter.

18. The system of claim 17, wherein the controller includes a state machine to select a state associated with the value of the operating parameter.

19. The system of claim 16, wherein the resistance value and the value of the operating parameter are listed in a chart associated with the device.

20. The system of claim 19, wherein the chart further lists an additional resistance value of the resistor and an additional value of an additional operating parameter associated with the additional resistance value.

21. A method comprising:
determining, by a device, a resistance value of a circuit path between a conductive contact and a circuit node during an initialization mode of the device, wherein the device includes a detection circuit and a controller;
selecting, by the device during the initialization mode of the device, a value of an operating parameter of the device based at least in part on the resistance value;
using, by the device, the selected value of the operating parameter in order to perform one or more functions after the completion of the initialization mode;
disabling, by the device after the completion of the initialization mode, at least a portion of the detection circuit; and
using, by the device after the completion of the initialization mode, the conductive contact as an input/output (I/O) contact for the controller.

22. The method of claim 21, wherein determining, by a device, a resistance value of a circuit path between a conductive contact and a circuit node during an initialization mode of the device comprises:
comparing a selected voltage in the device with a voltage at the conductive contact to provide a comparison result; and
generating a code based on the comparison result to select the value of the operating parameter of the device.

23. The method of claim 22, wherein selecting the operating parameter comprises selecting one of an operating frequency and an output voltage of the device.

24. The method of claim 23, wherein comparing a selected voltage in the device with a voltage at the conductive contact to provide a comparison result comprises successively comparing multiple selected voltages in the device with the voltage at the conductive contact until the comparison result indicates that one of the selected voltages has a value equal to a value of the voltage at the conductive contact.

25. The method of claim 21, further comprising:
transferring, by the device, data through the conductive contact after the completion of the initialization mode.

26. The method of claim 21, wherein the device enters the initialization mode when power is applied to the device.

27. The method of claim 21, wherein the selecting, by the device, a value of an operating parameter of the device during the initialization mode of the device comprises configuring one or more of a plurality of internal components of the device to operate at the selected value of the operating parameter of the device.

28. The method of claim 22, further comprising:
 storing, by the device, the code for subsequent use by the device when selecting a value of an operating parameter of the device.

* * * * *

UNITED STATES PATENT AND TRADEMARK OFFICE
CERTIFICATE OF CORRECTION

PATENT NO. : 8,504,816 B2
APPLICATION NO. : 12/686221
DATED : August 6, 2013
INVENTOR(S) : Frederic Marc Edouard Claudet and Bruno Pierre Lucien Poncet It is certified that error appears in the above-identified patent and that said Letters Patent is hereby corrected as shown below:

Title Page, Section (73) – Assignee: delete "Cedez" and insert --Cedex--.

In the Specification

Column 10, Line 39: delete "KS)" and insert --K$\Omega$--.

Signed and Sealed this
Fifteenth Day of October, 2013

Teresa Stanek Rea
*Deputy Director of the United States Patent and Trademark Office*